United States Patent
Durot et al.

(10) Patent No.: US 6,521,680 B1
(45) Date of Patent: *Feb. 18, 2003

(54) RESINOUS MONOCOMPONENT COMPOSITION WITH IMPROVED ADHESIVE PROPERTIES, PARTICULARLY FOR THE PRODUCTION OF SEALS

(75) Inventors: Louis Durot, Paris (FR); Pierre Etienne Bindschedler, Obernai (FR)

(73) Assignee: Soprema, Strasbourg (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/471,691

(22) Filed: Dec. 23, 1999

(30) Foreign Application Priority Data

Dec. 24, 1998 (FR) .............................. 98 16602

(51) Int. Cl.⁷ .............................................. C08L 95/00
(52) U.S. Cl. ........................................................ 524/59
(58) Field of Search ............................................ 524/59

(56) References Cited

U.S. PATENT DOCUMENTS

| | | | |
|---|---|---|---|
| 3,980,597 A | | 9/1976 | Shihadeh |
| 4,077,928 A | * | 3/1978 | Koons ........................ 260/28.5 |
| 4,153,594 A | * | 5/1979 | Wilson ........................ 260/31.8 |
| 4,443,578 A | * | 4/1984 | Frier ........................... 524/705 |
| 4,871,792 A | | 10/1989 | Lucke |
| 5,981,010 A | * | 11/1999 | Terry ........................... 428/40.1 |

FOREIGN PATENT DOCUMENTS

| | | |
|---|---|---|
| DE | 44 08 154 | 9/1995 |
| GB | 2 242 435 | 10/1991 |

* cited by examiner

*Primary Examiner*—Edward J. Cain
(74) *Attorney, Agent, or Firm*—Young & Thompson

(57) ABSTRACT

Resinous monocomponent composition with improved adhesive properties, based on a bitumen/polyurethane prepolymer mixture and adapted to constitute a sealing layer or a portion of a sealing layer, characterized in that the molecules of polyurethane prepolymer comprise at least one segment or group comprising at least 30 atoms of pure hydrogenated carbon.

10 Claims, 1 Drawing Sheet

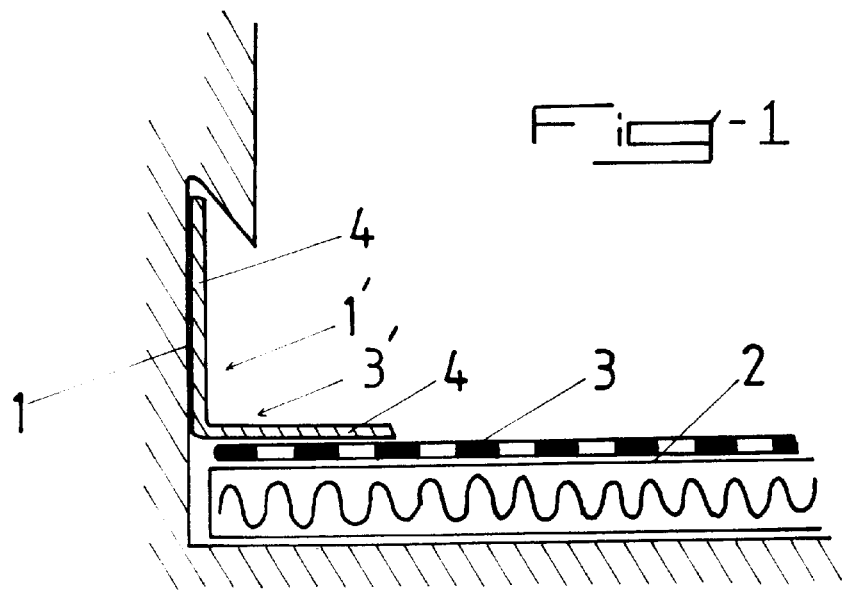
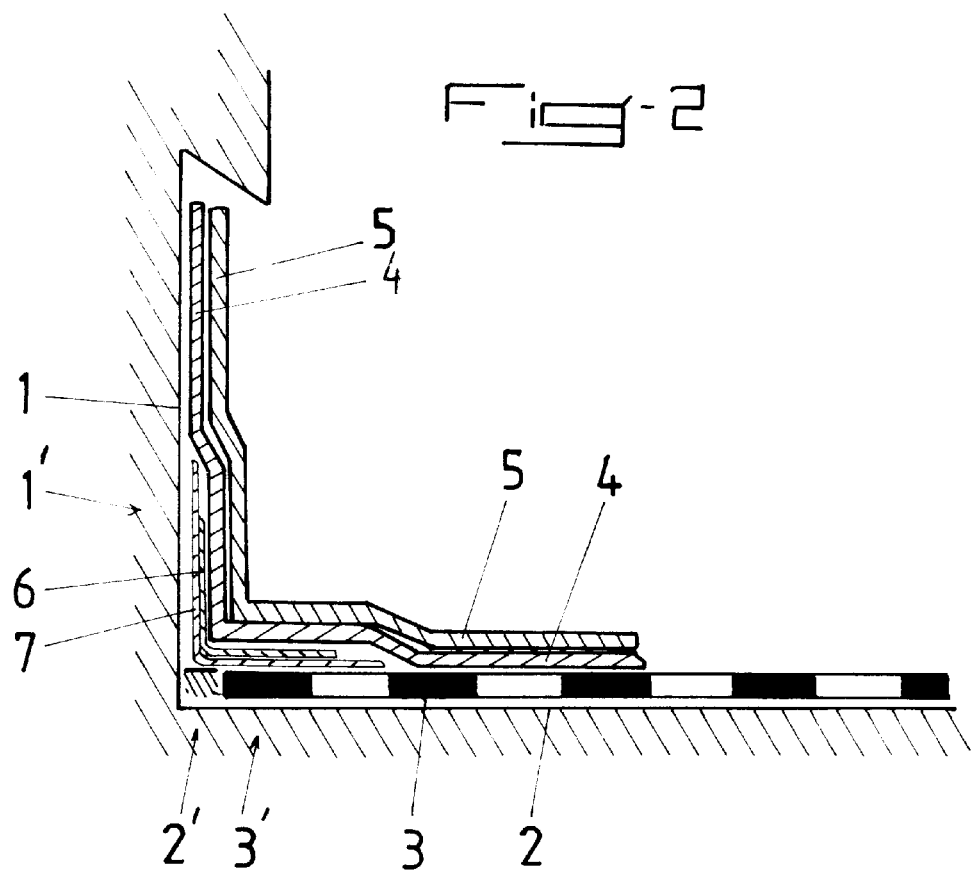

RESINOUS MONOCOMPONENT COMPOSITION WITH IMPROVED ADHESIVE PROPERTIES, PARTICULARLY FOR THE PRODUCTION OF SEALS

FIELD OF THE INVENTION

The present invention relates to the field of construction, of public works and civil engineering, in particular the sealing of works, and has for its object a resinous composition with improved adhesive properties, as well as its use, in particular for sealing road work.

BACKGROUND OF THE INVENTION

Seals in construction and public works are often made, particularly for flat horizontal surfaces, of membranes or bituminous sheets fixed on the support by partial melting of their undersurface to obtain intimate and resistant adherence.

However, the use of burners or similar heating apparatus in certain regions of the surfaces to be covered adjacent openings can transmit flames, inflammable elements or loose material can give rise to the risk of the beginning of burning during the application of the flame or, even worse, the risk of burning after the work, by reactivation of the combustion of the slowly combustible materials having been in contact with the flame, such as for example thermal insulating materials, often hidden and covered by other materials less sensitive to heat.

There are of course also known sealing sheets with a cold self-adhesive undersurface, however they are difficult to emplace from a standpoint of coming unfastened and do not give rise to sufficiently great adherence to supply an intimate surface contact and a securement that is resistant over time, especially on inclined or vertical surfaces.

There also exist liquid or viscous sealing products, particularly bitumen based, that can be easily applied with a spatula or a brush, particularly at places where the installation of sheets is difficult.

Nevertheless, these liquid or viscous products often have insufficient elasticity to resist without damage the movements or deformations of the support, an unstable sealing over the course of time, poor resistance to UV and, above all, insufficient adhesivity to ensure sufficiently intimate, resistant and durable fastening on different supports, particularly inclined or vertical supports.

It is thus often necessary, in order to use these known liquid or viscous products, to provide a primary adhesion and/or a specific supplemental protective layer.

Finally, there are already known liquid sealing products in the form of bitumen/polyurethane mixtures, integrating large quantities of plastifiers, generally in the form of aromatic oils, and/or of fillers or liquid diluents.

However, these products, described for example in U.S. Pat. Nos. 5,319,008 and 4,871,792, have particularly a limited lifetime, the bitumen support or supports being attacked by oil, and this latter, as well as the filler or the liquid diluent, weakening the prepolymers of polyurethane used in these products, generating micro-cracks in the layer of applied product with a relatively short lifetime.

Moreover, these known products have a relatively limited strength of adhesion, requiring necessarily a specific protection against UV and having a relatively low resistance to chemical attack resulting from atmospheric agents, rendering hazardous their use on external or exposed sites, excluding a ten-year life outside and limiting their use to protected sites.

Moreover, the presence of large quantities of plastifiers and diluents, relative to the quantity of bitumen, results in a high cost.

Finally, these known bitumen/polyurethane mixtures are not used and cannot be used in monocomponent form, which would greatly facilitate their use, in particular at work sites.

SUMMARY OF THE INVENTION

The present invention has particularly for its object to overcome the mentioned drawbacks and to provide a product of the bitumen/polyurethane type, easy to use, tolerating a high proportion of bituminous mixture in its composition, having high strength and resistance and durable for unprotected outdoor use and requiring no primary adhesive layer, no matter what the nature of the support to which applied.

To this end, it has for its object a resonance monocomponent composition with improved adhesive properties, based on a bitumen/polymer base of polyurethane and adapted to constitute a sealing layer or a portion of a sealing layer, characterized in that the molecules of polyurethane prepolymer comprise at least one segment or group comprising at least 30 atoms of purely hydrogenated carbon.

BRIEF DESCRIPTION OF THE DRAWINGS

The invention will be better understood from the following description, which relates to preferred embodiments, given by way of non-limiting examples, and explained with reference to the accompanying schematic drawing, in which:

FIG. 1 is a side elevational cross-sectional view of the use of the resinous composition at the level of a recess or a relief, according to the first embodiment of the invention, and, FIG. 2 is a side elevational cross-sectional view of the use of the resinous composition in a recess or a relief, according to a second modified embodiment of the invention.

DESCRIPTION OF THE PREFERRED EMBODIMENTS

According to the invention, the resinous monocomponent composition with adhesive properties, based on a bitumen/polyurethane prepolymer mixture, is characterized in that the molecules of polyurethane prepolymer comprise at least one segment or group comprising at least 30 atoms of purely hydrogenated carbon.

According to a first embodiment of the invention, the molecules of polyurethane prepolymer have a polymeric chain, preferably with substantially linear structure, that is totally hydrocarbonated.

According to a second embodiment of the invention, the molecules of polyurethane prepolymer are formed by successions of at least two non-polar hydrocarbonated segments of the type $(C_nH_p)_m$, with $m \geq 30$.

This resinous composition could for example be principally comprised by 45 to 90% by weight of a bituminous mixture, if desired loaded, of 10 to 55% by weight of polyurethane prepolymer and a sufficient quantity of a suitable catalyst, the weight ratio of the bituminous/prepolymer mixture being preferably greater than 1.5.

According to a non-limiting embodiment of the invention, said resinous composition could be more precisely comprised by 50 to 85%, preferably 70 to 80%, by weight of a loaded bituminous mixture, of 15 to 50%, preferably 15 to 25%, by weight of a polyurethane precursor mixture, formed principally of a prepolymer based on hydrocarbon polyol chains (such as for example linear hydroxilated polybutadiene or polybutadiene hydroxilated acrylonitrile of the HYCAR type), from 0.01 to 1%, preferably 0.05 to 0.25%, by weight of a suitable catalyst, from 0 to 10%, preferably 0.5 to 3.0%, by weight of a hydrocarbon solvent, from 0 to 10%, preferably 0.5 to 3.0%, by weight of a light polar solvent, of 0 to 5%, preferably 1.0 to 3.5% by weight of thixotropic agents and from 0 to 5%, preferably 0.1 to 2.5%, by weight of an isocyanate substance, preferably of the diisocyanate type, or any other product or substance adapted to react with the sites of the bitumen (R—OH, R—NH—R, R—SH, . . . ).

The above loaded bituminous mixture could be comprised, by way of example, of 30 to 80%, preferably from 35 to 75%, by weight of bitumen, 0 to 45%, preferably 0 to 40%, by weight of a mineral filler and from 5 to 30%, preferably 10 to 25%, by weight of a petroleum solvent.

The bitumen used could for example have a coefficient of penetration at 20° C. of 180 to 220 ¹⁄₁₀th mm and a softening temperature comprised between 30 and 45° C.

The petroleum solvent, adapted to render the bitumen workable for the production of the loaded bituminous mixture, could be oil (for example F oil) or aromatic solvents (xylene, toluene).

The loaded bituminous mixture could, supplementally, also comprise, on the one hand, between 0 and 20% by weight of a pigment, for example $TiO_2$, and, on the other hand, between 0 and 8% of a desiccant agent, preferably mineral.

One type of bituminous mixture that can be used in the framework of the invention is, for example, that known by the designation Plastisol Bitumen of the assignee.

However, as a modification, the production of the loaded bituminous mixture could be carried out in the course of the preparation of the resinous composition when a cast bitumen is used.

The polyurethane prepolymer in the resinous composition according to the invention could for example be obtained by mixing the following ingredients, with the indicated weight proportions, namely:

| | |
|---|---|
| Isocyanate | 14.0% |
| (for example TDI-Toluylene diisocyanate) | |
| Polyol of the dimer fatty ester type | 66.5% |
| (for example of the type 3197 of the Unichema company) | |
| Hydrocarbon solvent (for example of the xylene type) | 10.5% |
| Polar solvent (for example of the methyl ethyl ketone type) | 9.0% |

After mixing, these ingredients are heated for about two hours at about 80° (in the presence of benzoyl chloride 1 to 2%) to obtain the polyurethane prepolymer.

There is thus obtained a polyol aliphatic base resin compatible with high doses of bitumen, without requiring a high proportion of plastifying dissolving adaptor, of the fatty glycol fatty ester type, esters of di-acid hydrocarbon of a hydrocarbon glycol, hydroxyl polydene (such as the polyol HYCAR or the polyol KRATON) or dimer fatty acid polyesters or hexane diol.

By way of an example of practical embodiment, the resinous composition according to the invention could preferably have the following weight composition:

| | |
|---|---|
| Polyurethane prepolymer obtained in the manner described above | 17.6% |
| BITUMEN plastisol | 77.0% |
| MDI (Diphenylmethane diisocyanate) | 0.5% |
| Hydrocarbon solvent | 1.4% |
| Light polar solvent | 1.4% |
| Catalyst | 0.1% |
| Thixotropic agents | 2.0% |

The hydrocarbon solvent could consist for example of a product of the same type as the petroleum solvent mentioned above, or if desired an oil compatible with the bitumen used. This solvent, preferably toluene, serves essentially to render the plastisol BITUME compatible with the polar resin.

The light polar solvent could consist for example of a substance of the ketone family (acetone, methylethylcetone, butylethylcetone, . . . ), acetate esters (ethyl acetate, butyl acetate, . . . ) or ester-ethers of glycols (methoxypropanol acetate, . . . ). This solvent serves to render fluent the resin and permits a decrease in the quantities of solvent by a synergetic effect with the hydrocarbon solvent.

The catalyst used could be of the aliphatic or aromatic amine type (triethylamine, DABCO, TMBDA, . . . ) or of the organo-metal type (tin octate, DBTL, . . . ), preferably DBTL.

The thixotroping substances could consist of mineral thixotropics (bentonites, pyrolyzed silica, . . . ), organic fibers (polyethylene, Kevlar [trademark], . . . ) or the like. The thixotropic agents modify the rheological properties of the composition and avoid running in vertical application whilst guaranteeing sufficient fluidity to permit easy manipulation.

The resinous compound obtained according to the illustration and non-limiting example described above, is present in the form of a monocomponent thixotropic paste of brown color, having the following properties according to analyses carried out by the inventors:

| | |
|---|---|
| Dry extract (by mass): | 79% |
| Volumetric mass at 25° C.: | 1300 kg/m³ |
| Volumetric mass dry extract: | 1400 kg/m³ |
| Resistance to rupture: | 0.123 MPa |
| Elongation at rupture: | 360% |
| Viscosity: | 9200 +/− 1000 CP |

So as to evaluate the properties of adherence of the illustrative example of a resinous composition described above, the inventors have carried out different tests (1 to 3) whose results are given hereafter.

1) Pealing at 90° at a speed of 10 mm/min (N/5 cm)

| Support | Concrete | Galvanized iron | Wood |
|---|---|---|---|
| 7 drys of drying | 85 | 65 | 25 |
| 7 days in water plus 20 days of drying | 110 | 75 | 25 |

2) Pealing at 90° at a speed of 10 mm/min of the resin applied to different surfaces of bituminous membranes (N/5 cm)

| Surface | Sanded | Slate | Aluminum | PEHD | Lacquered aluminum | Bitumen |
|---|---|---|---|---|---|---|
| 7 days of drying | 30 | 30 | 15 | 1 | 50 | 15 |
| 7 days in water + 18 days of drying | 54 | 40 | 55 | 3 | 55 | 25 |
| 1 month at 80° C. | | 100 | | | | 35 |
| 2 months at 80° C. | | 100 | | | | 45 |

PEHD = High density polyethylene

3) Pealing at 90° at a speed of 10 mm/min on profiled PVC

| | Resistance (N/5 cm) |
|---|---|
| 7 days of drying | 15 |
| 7 days in water | 10 |
| 15 days at 70° C. | 30 |
| 1 month at 70° C. | 35 |

The mentioned resinous composition is preferably packaged in the form of a monocomponent integrating all the ingredients in single viscous mixture, very easy to use, but which if could if desired also be packaged in a bicomponent form, or even tricomponent, to be mixed before application, permitting longer duration storage.

The present invention also has for its object a process for the production of a sealing coating extending vertically, horizontally or on the incline, of an existing traditional sealing coating (prefabricated bituminous or synthetic or cast asphalt sheets), characterized in that it consists in applying directly onto the support surface to be covered, without preliminary application of a primary layer, of one or several layers 4, 5 of a resinous monocomponent composition and with a high bitumen content such as described above, so as to obtain a sealed coating resistant to attack by atmospheric agents and particularly UV, particularly for at least a ten-year period.

As shown in FIGS. 1 and 2 of the accompanying drawing, the resinous composition according to the present invention can, in a particularly advantageous manner, be used in the context of a process for the production of a sealed coating on a portion of a support surface 1 that is vertical or inclined, connected to a bituminous sealed coating 3 on a principal support surface 2, contiguous to said support surface 1 and inclined relative to this latter.

This process could for example consist, after preparation of the concerned regions, in applying a layer 4 of a resinous composition on the portion of the surface 1 to be covered as well as on the border strip 2', 3' of the sealing coating 3 and, as the case may be, of the principal support surface 2, adjacent to said portion of surface 1 to be covered, and, after at least partial drying of this layer 4, applying, as the case may be, at least one second layer 5 of resinous composition so as to cover said first layer 4, so as to obtain a sealing coating resistant to UV, directly adhering to the surface portion 1, without a primary coat, comprising a high content of bitumen and adhering directly to the bituminous coating 3 without undergoing change with time and without loss of adherence.

In the case of the use of two layers 4 and 5, the quantity of resinous composition in the first layer 4 could for example correspond to about 600 to 800 g/m$^2$, preferably about 700 g/m$^2$, and the quantity of resinous composition in the second layer 5 could, for example, be about 800 to 1000 g/m$^2$, preferably about 900 g/m$^2$.

According to a supplemental characteristic of the invention, shown in FIG. 2 of the accompanying drawings, the mentioned process could also consist, before application of the first layer 4, in emplacing a core or a reinforcing layer 6 in the form of a grill or non-woven material, covering in particular the adjacent edge regions 1' and 3', 4', on the one hand, of the surface portion 1 to be covered and, on the other hand, of the sealing coating 3, and, as the case may be, of the principal support 2, said reinforcement or layer 6 being fixed by gluing by means of the resinous composition, before application of said first layer 4.

The composition according to the invention could, according to a first manner of use, be used to produce a sealing coating by application of one or several layers on a support, for example by means of a brush or a roller.

To increase the structural cohesion of the sealing coating thus obtained, it could be provided to emplace a core or a layer of reinforcement between two consecutive layers of resinous composition, each layer being for example constituted by about 0.5 kg/m$^2$ or 1.0 kg/m$^2$ of resinous composition.

The resinous composition could, within the scope of this modified use, constitute particularly a vapor barrier, for example on a concrete support.

So as to increase the resistance to weather and UV of the bitumen/polyurethane sealing product obtained by use of the composition according to the invention, it can be provided that the upper layer of resinous composition be covered with a protective layer of mineral particles, preferably flakes of slate.

According to a second embodiment of the invention, a second manner of use of the invention, said composition could also be used as a sealing cementing agent, particularly to assemble together two layers or membranes, in particular bituminous, or to fix a sheet or a membrane on a support, particularly non-horizontal.

Thanks to the invention, it is therefore possible to provide a resinous composition that can be applied cold and is adapted to sealing uses, permitting overcoming all the drawbacks mentioned above with respect to the different known products. This resinous composition, which is the object of the present invention, is easy to use because of its monocomponent composition, which particularly leads to greater adhesive performance on all types of supports without requiring a primary adhering coat and without altering the support and without notable loss of adhesion with time, on said support, particularly when the latter consists of or is formed by a bituminous base, high resistance to UV, and to attack by atmospheric agents, and low cost because of the high proportion of bitumen and, as the case may be, of filler.

Of course, the invention is not limited to the embodiments described and shown in the accompanying drawings. Modifications remain possible, particularly as to the construction of the various elements or by substitution of technical equivalents, without thereby departing from the scope of protection of the invention.

What is claimed is:

1. A resinous composition that is ready to use, and that has improved adhesive properties and improved resistance to UV, and that is adapted to constitute a sealing layer or a portion of a sealing layer, said composition consisting essentially of a bitumen/polyurethane prepolymer mixture, the molecules of the polyurethane prepolymer comprising at least one segment or group consisting at least 30 atoms of unsubstituted and saturated carbon, wherein said bitumen/polyurethane prepolymer mixture is fluent and storage-stable as a single viscous mixture without curing of the resinous composition.

2. A method of producing a sealing coating, comprising applying at least one layer of a composition according to claim 1 onto a support.

3. A method as claimed in claim 2, and covering said layer with a protective layer of mineral particles.

4. A method as claimed in claim 2, wherein said support comprises a first sheet or membrane, and applying a second sheet or membrane on the side of said layer that is opposite said first sheet or membrane.

5. Composition according to claim 1, wherein the molecules of polyurethane prepolymer have a polymer chain of substantially linear structure, which is totally hydrocarbon.

6. Composition according to claim 1, wherein the molecules of polyurethane prepolymer are formed by sequences or at least two non-polar hydrocarbon segments of the $(C_nH_p)_m$, type, wherein $m \geq 30$.

7. Composition according to claim 1, wherein which is principally comprised by 45 to 90% by weight of a bituminous mixture, 10 to 55% by weight of a polyurethane prepolymer and a catalyst, the weight ratio of the bitumen/prepolymer mixture being preferably greater than 1.5.

8. Process for the production of a sealing coating extending vertically, horizontally or inclined, from an existing conventional sealing coating, which consists in applying directly onto the support to be covered, without preliminary application of a prime coat, one or several layers (4, 5) of a resinous monocomponent composition with a high bitumen content according to claim 1, so as to obtain a sealing coating resistant to attack by atmospheric agents and particularly by UV.

9. Process for the production of sealing coating on a portion of a vertical or inclined support surface, connected to a bituminous sealing coating on a principal support surface, contiguous to said support surface and inclined relative to this latter, which consists in applying a layer (4) of resinous monocomponent composition according to claim 11 to the portion of the surface (1) to be covered as well as on a border strip (2', 3') of the sealing coating (3) and of the principal support surface (2), adjacent to said portion of the surface (1) to be covered and, after drying at least partially this layer (4), applying at least a second layer (5) of resinous composition so as to cover said first layer (4), to obtain a sealing coating resistance to UV, adhering directly to the portion of the surface (1), without a primary coat, comprising a high content of bitumen and adhering directly on the bituminous coating (3) without undergoing alteration over time and without loss of adherence.

10. Process according to claim 9, which consists, before application of the first layer (4), in emplacing a core or a reinforcing layer (6) in the form of a grill or non-woven, covering the adjacent border regions (1' and 3', 4'), on the one hand, of the portion of the surface (1) to be covered and, on the other hand, of the sealing coating (3) and of the principal support surface (2), said core or layer (6) being fixed by gluing by means of the resinous composition, before application of said first layer (4).

* * * * *